US012662874B2

(12) United States Patent
Butler et al.

(10) Patent No.: US 12,662,874 B2
(45) Date of Patent: Jun. 23, 2026

(54) LOCKING MECHANISM FOR A WINDOW TREATMENT FASCIA

(71) Applicant: Lutron Technology Company LLC, Coopersburg, PA (US)

(72) Inventors: Nathan J. Butler, Telford, PA (US); Rachel Sloan, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 98 days.

(21) Appl. No.: 18/735,675

(22) Filed: Jun. 6, 2024

(65) Prior Publication Data

US 2024/0410225 A1 Dec. 12, 2024

Related U.S. Application Data

(60) Provisional application No. 63/506,739, filed on Jun. 7, 2023.

(51) Int. Cl.
*E06B 9/80* (2006.01)

(52) U.S. Cl.
CPC .......... *E06B 9/80* (2013.01); *E06B 2009/804* (2013.01)

(58) Field of Classification Search
CPC ................. E06B 9/80; E06B 2009/801; E06B 2009/804; E06B 3/32; E06B 9/17; E06B 9/42; E06B 9/17023; E04F 10/0685; A47H 1/14
See application file for complete search history.

(56) References Cited

U.S. PATENT DOCUMENTS

| | | | | |
|---|---|---|---|---|
| 4,197,896 A | | 4/1980 | Reichstadt | |
| 5,205,334 A | * | 4/1993 | Judkins | E06B 9/24 160/242 |
| 5,330,821 A | * | 7/1994 | Lo | A47H 2/02 248/265 |
| 5,533,560 A | * | 7/1996 | Morris | E06B 9/323 160/902 |
| 6,672,359 B2 | * | 1/2004 | Morris | A47H 2/00 160/19 |
| 6,712,115 B2 | * | 3/2004 | Judkins | E06B 9/266 160/84.01 |

(Continued)

FOREIGN PATENT DOCUMENTS

| | | | | |
|---|---|---|---|---|
| EP | 2031177 A2 | * | 3/2009 | E06B 9/42 |

*Primary Examiner* — Beth A Stephan
(74) *Attorney, Agent, or Firm* — Philip N. Smith; Glen R. Farbanish; Michael S. Czarnecki

(57) ABSTRACT

A window treatment system may include a mounting bracket, a fascia, and a locking mechanism for locking the fascia to the mounting bracket. The fascia may have an attachment structure for coupling the fascia to the mounting bracket and a locking member extending from a rear surface of the fascia. The locking mechanism may comprise a lever supported by and configured to pivot with respect to the mounting bracket, and an actuation member configured to contact a contact surface of the lever. The actuation member may be driven in a first direction to cause the contact surface of the lever to move in the first direction and a locking tab of the lever to move in a second direction opposite the first direction to operate the locking mechanism into a locked position in which the locking tab is received in a recess of the locking member of the fascia.

20 Claims, 8 Drawing Sheets

(56) References Cited

U.S. PATENT DOCUMENTS

| | | | | |
|---|---|---|---|---|
| 6,935,401 | B2 * | 8/2005 | Fraczek | E06B 9/50 160/321 |
| 6,941,996 | B2 * | 9/2005 | Ward | E06B 9/264 160/89 |
| 7,134,469 | B2 * | 11/2006 | Drew | E06B 9/42 248/273 |
| 7,516,771 | B2 * | 4/2009 | Drew | E06B 9/323 248/220.21 |
| 7,730,923 | B2 * | 6/2010 | Zhang | E06B 9/323 160/19 |
| 8,960,621 | B2 * | 2/2015 | Wills | E06B 9/174 160/19 |
| 9,045,939 | B2 | 6/2015 | Blair et al. | |
| 9,060,636 | B2 * | 6/2015 | Cannaverde | A47H 1/14 |
| 9,347,261 | B2 | 5/2016 | Blair et al. | |
| 10,094,169 | B2 | 10/2018 | Kirby | |
| 10,334,977 | B2 | 7/2019 | Filko | |
| 10,378,276 | B2 * | 8/2019 | Garcia Garcia | E06B 9/50 |
| 10,407,982 | B2 | 9/2019 | Chambers et al. | |
| 11,002,071 | B2 * | 5/2021 | Campagna | E06B 9/72 |
| 11,395,555 | B2 * | 7/2022 | Mullet | A47H 2/00 |
| 11,814,897 | B2 * | 11/2023 | Chiquin | E06B 9/42 |
| 11,946,317 | B2 * | 4/2024 | Cugier | E06B 9/50 |
| 12,044,066 | B2 | 7/2024 | Kirby et al. | |
| 2008/0289775 | A1 * | 11/2008 | Lukos | E06B 9/50 160/242 |
| 2011/0006176 | A1 * | 1/2011 | Krantz-Lilienthal | F16B 2/245 248/222.11 |
| 2011/0114809 | A1 | 5/2011 | Ng | |
| 2011/0253320 | A1 * | 10/2011 | Baugh | E06B 9/262 160/405 |
| 2013/0098561 | A1 * | 4/2013 | Mullet | E06B 9/50 160/39 |
| 2020/0154925 | A1 * | 5/2020 | Yu | A47H 1/13 |
| 2022/0049546 | A1 * | 2/2022 | Daugaard | A47H 5/0325 |
| 2023/0151682 | A1 | 5/2023 | Fiebig et al. | |

* cited by examiner

LOCKING MECHANISM FOR A WINDOW TREATMENT FASCIA

CROSS-REFERENCE TO RELATED APPLICATIONS

This application claims priority to U.S. Provisional Patent Application No. 63/506,739, filed on Jun. 7, 2023, the entire disclosure of which is incorporated by reference herein.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto a roller tube. Such a roller shade may include a weighted bottom bar (e.g., a hembar) located at a lower end of the shade fabric. The bottom bar may cause the shade fabric to hang in front of one or more windows that the roller shade is mounted in front of.

A window treatment may be motorized. For example, a motorized roller shade may include a motor drive unit that is coupled to the roller tube to provide for tube rotation. When operated, the motor drive unit may cause the roller tube to rotate, such that the lower end of the shade fabric is raised or lowered, for example along a vertical direction. The motor drive unit of a motorized window treatment (e.g., a roller shade) may be powered, for example, by an alternating-current (AC) source, a direct-current (DC) source, by one or more batteries, or any combination thereof.

In an example motorized roller shade, the motor drive unit and the roller tube may be retained within a housing that is mounted in front of one or more windows. Such a motorized roller shade may include a fascia that is configured to conceal components of the window treatment, such as the motor drive unit, the roller tube, and a portion of the flexible shade fabric. Such a fascia, which may alternatively be referred to as a valence, is typically made of a material such as plastic or metal, etc., which may contrast aesthetically with the shade fabric.

SUMMARY

As described herein, an apparatus for use with a window treatment system may comprise a mounting bracket, a fascia, and a locking mechanism for locking the fascia to the mounting bracket. The window treatment system may comprise a window treatment assembly having a covering material that is operable between a raised position and a lowered position. The mounting bracket may be configured to support the window treatment assembly. The fascia may have an attachment structure for coupling the fascia to the mounting bracket. The attachment structure may extend from a rear surface of the fascia. The fascia may also have a locking member extending from the rear surface of the fascia. The locking mechanism may comprise a lever supported by the mounting bracket and configured to pivot with respect to the mounting bracket. The lever may comprise a first end having a locking tab and a second end having a contact surface. The locking mechanism may further comprise an actuation member configured to contact the contact surface at the second end of the lever. The actuation member may be configured to be driven in a first direction to cause the second end of the lever to move in the first direction and the first end of the lever to move in a second direction opposite the first direction to operate the locking mechanism into a locked position in which the locking tab is received in a recess of the locking member of the fascia. The actuation member may be further configured to move in the downward direction to operate the locking mechanism into an unlocked position in which the locking tab is not received in the recess of the locking member of the fascia.

DETAILED DESCRIPTION

Figure 1:
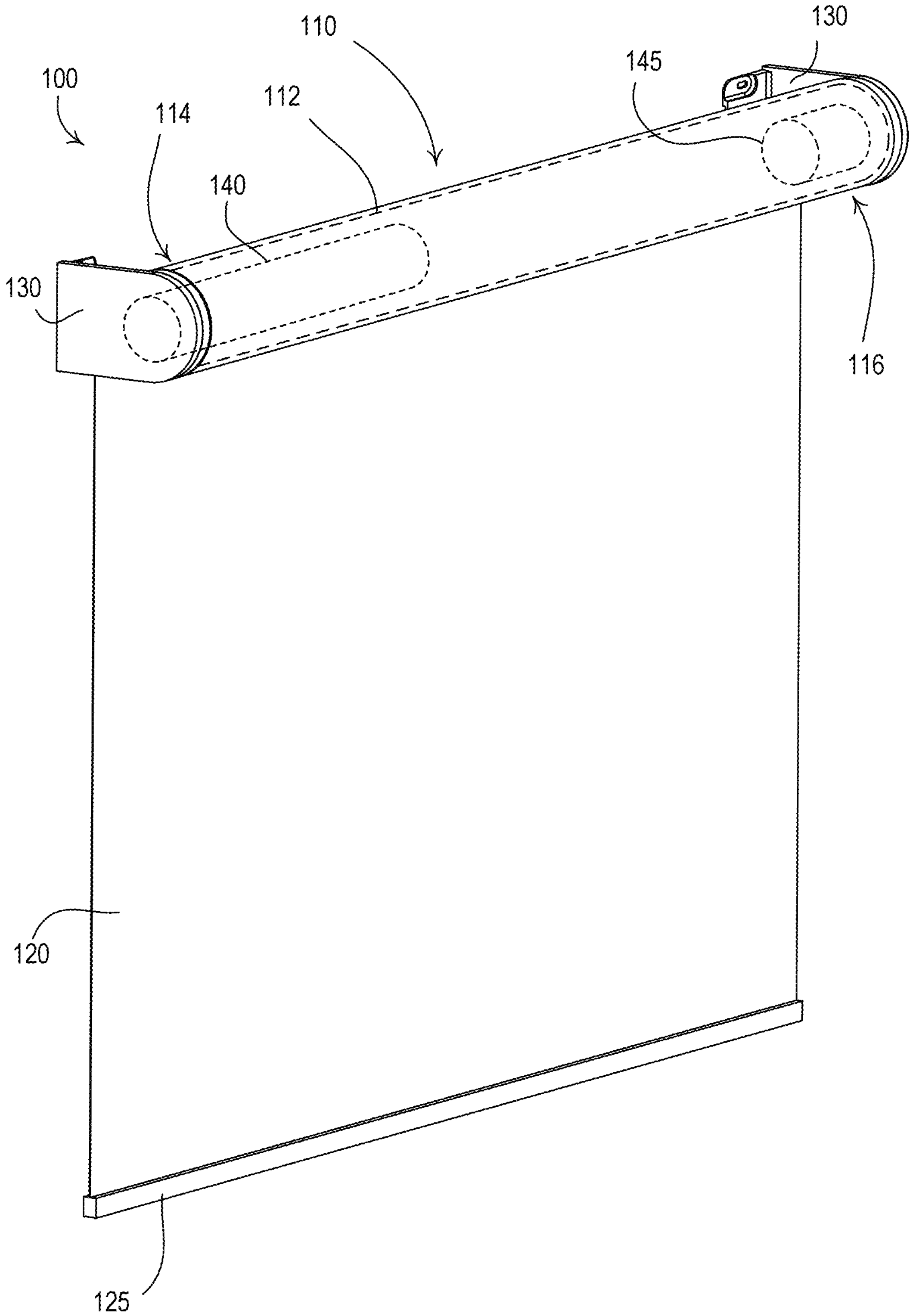
FIG. 1 is a perspective view of an example motorized window treatment system in a forward roll configuration.
Figure 2:
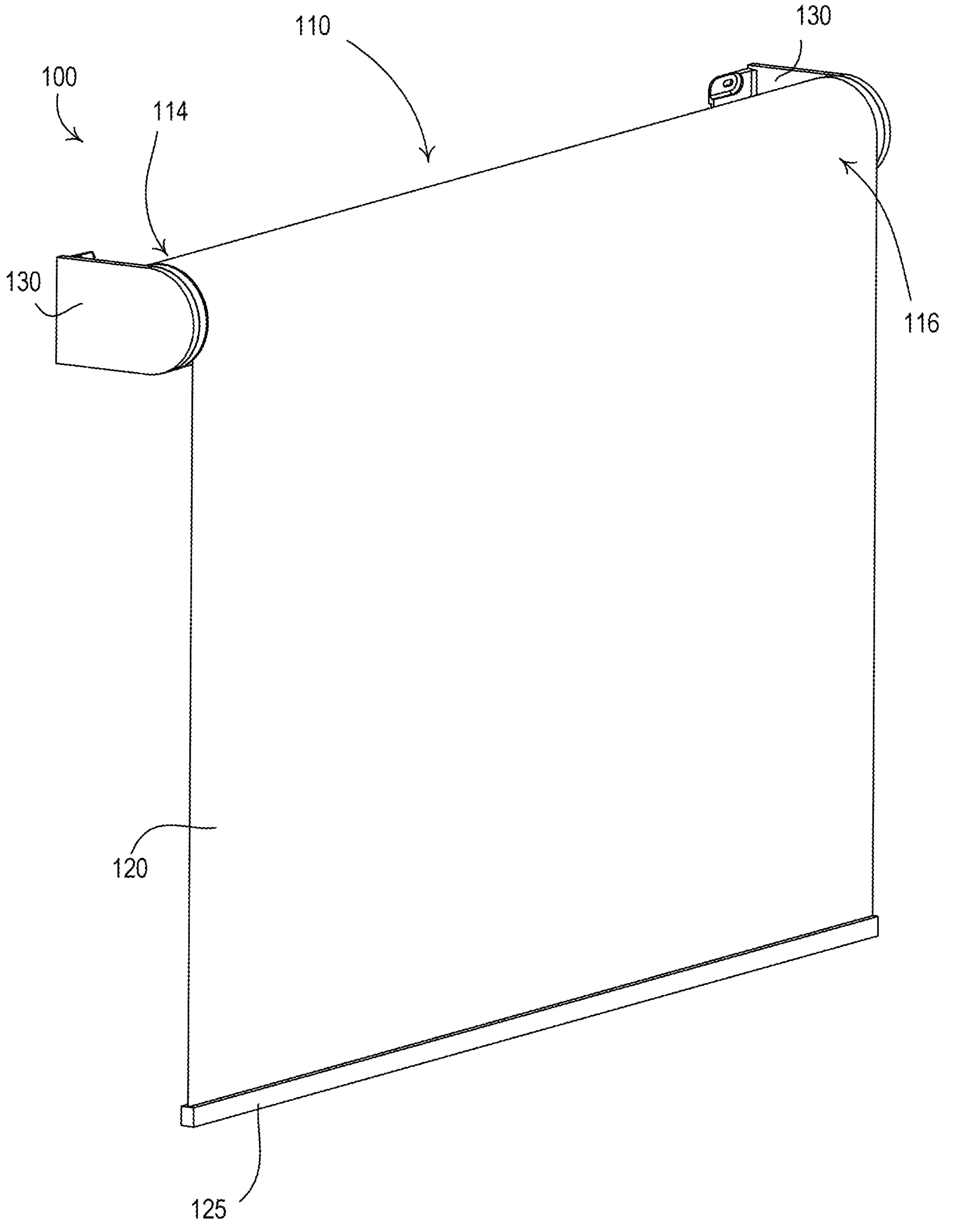
FIG. 2 is a perspective view of the motorized window treatment system of FIG. 1 in a reverse roll configuration.

FIG. 1 is a perspective view of an example motorized window treatment system 100 (e.g., a motorized roller shade). The motorized window treatment system 100 may comprise a roller tube 112 and a covering material 120 (e.g., a flexible material, such as a flexible shade fabric) windingly attached to the roller tube 112. The motorized window treatment system 100 may include a window treatment assembly 110 (e.g., a roller shade assembly) and one or more mounting brackets 130. The window treatment assembly 110 may include the roller tube 112, the covering material 120, a motor drive unit 140 at a first end 114 of the window treatment assembly 110, and an idler 145 at a second end 116 of the window treatment assembly 110. The mounting brackets 130 may be configured to be coupled to or otherwise mounted to a structure. For example, each of the mounting brackets 130 may be configured to be mounted to (e.g., attached to) a window frame, a wall, or other structure, such that the motorized window treatment 100 is mounted proximate to an opening (e.g., over the opening or in the opening), such as a window for example. The mounting brackets 130 may be configured to be mounted to a vertical structure (e.g., wall-mounted to a wall as shown in FIG. 2) and/or mounted to a horizontal structure (e.g., ceiling-mounted to a ceiling).

The roller tube 112 may operate as a rotational element of the motorized window treatment system 100. The window treatment assembly 110 may be rotatably mounted (e.g., rotatably supported) by the mounting brackets 130. The mounting brackets 130 may extend from the structure to which the motorized window treatment 100 is mounted. The covering material 120 may be windingly attached to the roller tube 112, such that rotation of the roller tube 112 causes the covering material 120 to wind around or unwind from the roller tube 112. For example, rotation of the roller tube 112 may cause the covering material 120 to move between a raised position $P_{RAISED}$ (e.g., a fully-raised position and/or a fully-open position) and a lowered position $P_{LOWERED}$ (e.g., a fully-lowered position and/or a fully-closed position). The covering material 120 may include a first end (e.g., a top or upper end) that is coupled to the roller tube 112 and a second end (e.g., a bottom or lower end) that is coupled to a bottom bar 125 (e.g., a hembar). The bottom bar 125 may be configured, for example weighted, to cause the covering material 120 to hang vertically. Rotation of the roller tube 112 may cause the bottom bar 125 to move toward or away from the roller tube 112 between the raised position $P_{RAISED}$ and the lowered position $P_{LOWERED}$.

The covering material 120 may be any suitable material, or form any combination of materials. For example, the covering material 120 may be "scrim," woven cloth, non-woven material, light-control film, screen, and/or mesh. The motorized window treatment system 100 may comprise any type of window treatment. For example, the motorized window treatment system 100 may comprise a roller shade as illustrated, a soft sheer shade, a drapery, a cellular shade, a Roman shade, or a Venetian blind. As shown, the covering material 120 may be a material suitable for use as a shade fabric, and may be alternatively referred to as a flexible material. The covering material 120 is not limited to shade fabric. For example, in accordance with an alternative implementation of the motorized window treatment system 100 as a retractable projection screen, the covering material 120 may be a material suitable for displaying images projected onto the covering material.

As shown in FIG. 1, the motorized window treatment system 100 may be configured in a forward roll configuration in which the covering material 120 may hang from the roller tube 112 near the window (e.g., the covering material 120 may hang between the roller tube 112 and the window). The motorized window treatment system 100 may also be configured in a reverse roll configuration in which the covering material 120 may hang from the roller tube 112 away from the window (e.g., the roller tube 112 may be located between the window and the covering material 120 that is hanging from the roller tube 112) as shown in FIG. 2.

Figure 3:
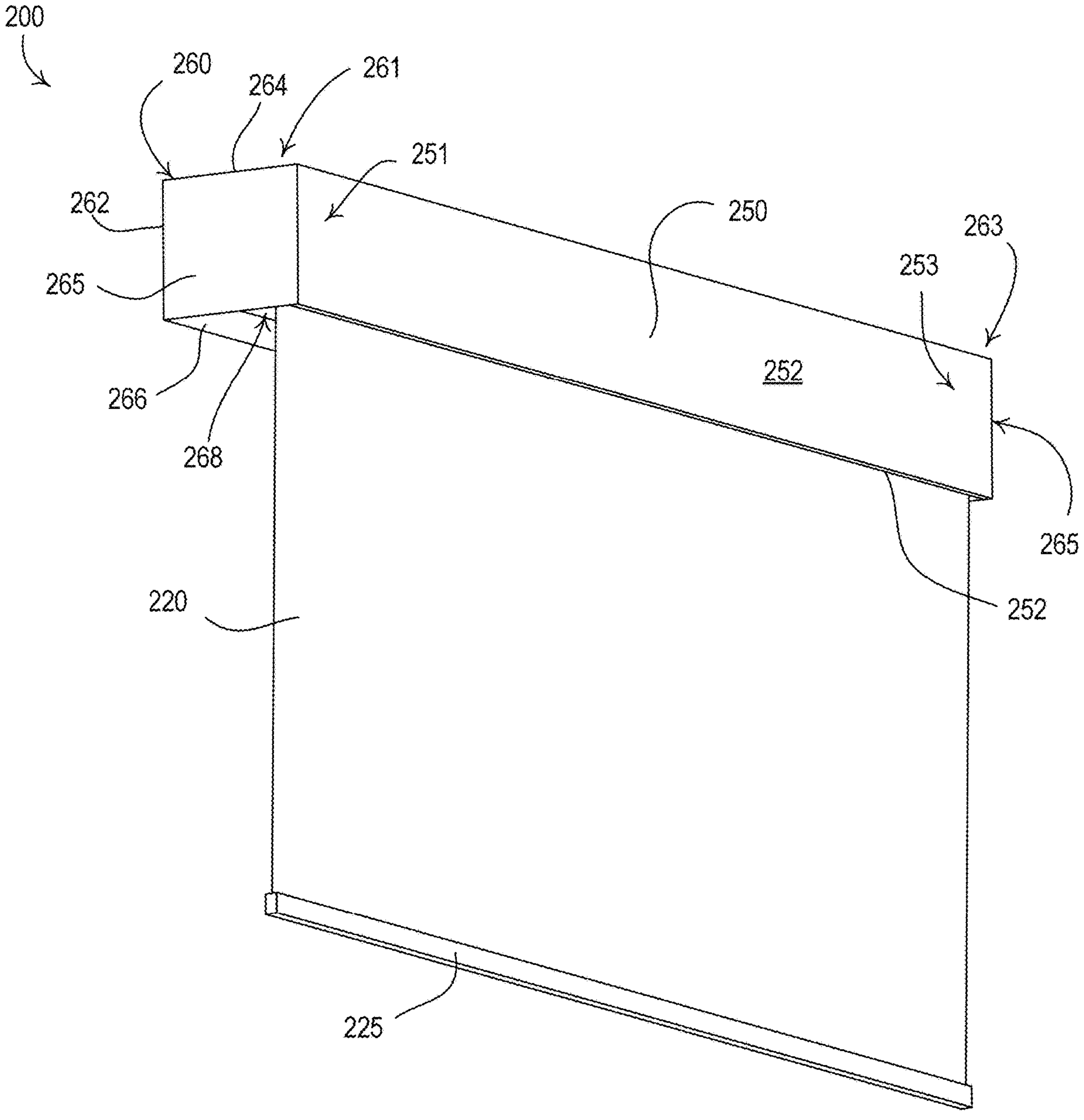
FIG. 3 is a perspective view of an example window treatment system having a fascia.
Figure 4:
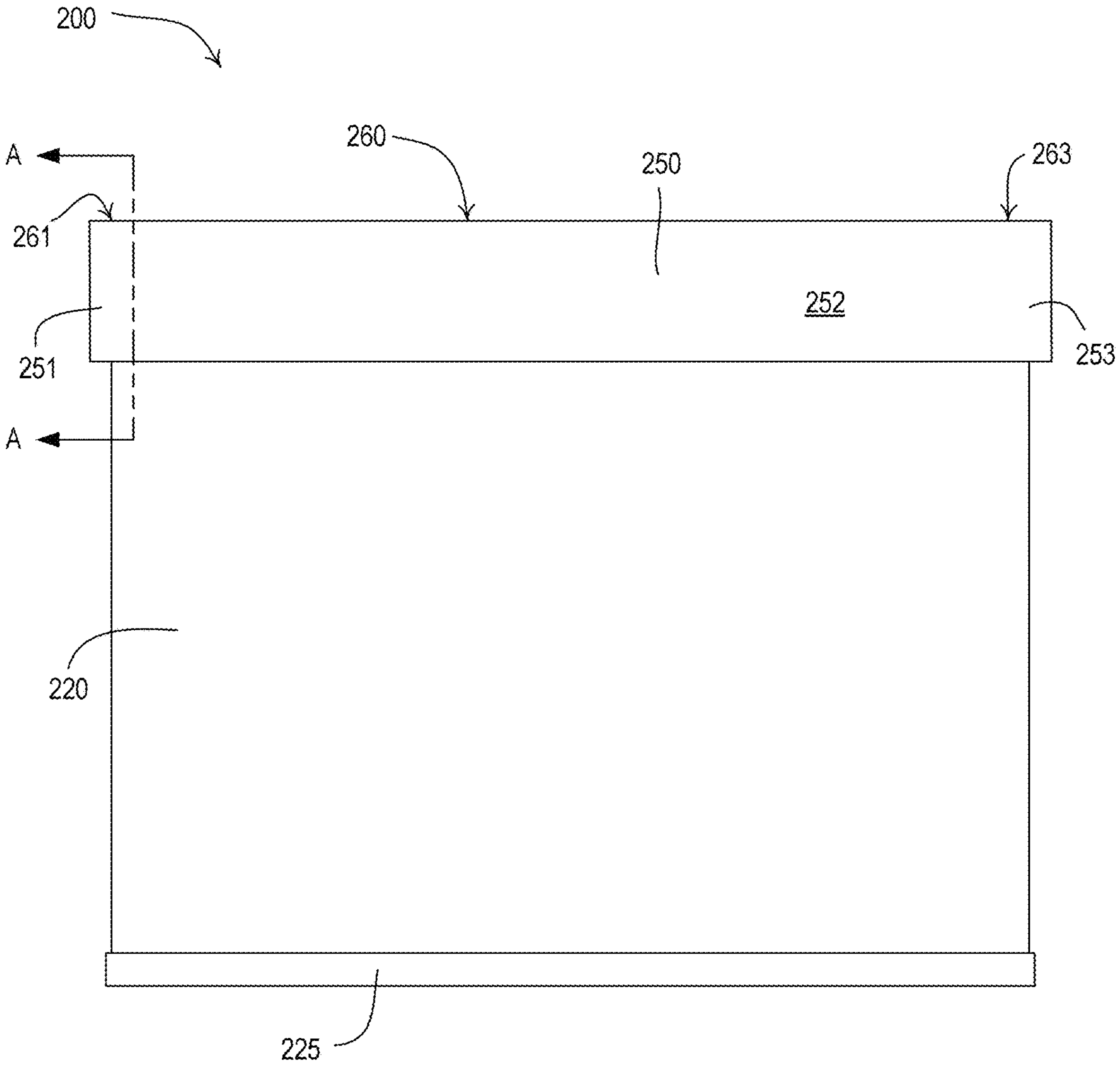
FIG. 4 is a front view of the window treatment system of FIG. 3.

In some examples, a window treatment system (e.g., a motorized window treatment system) may comprise a fascia for covering a roller tube and/or mounting brackets of the window treatment system. FIG. 3 is a perspective view and FIG. 4 is a front view of another example window treatment system 200 (e.g., a motorized roller shade) having a fascia 250. The window treatment system 200 may comprise a roller tube (e.g., such as the roller tube 112) and a covering material 220 (e.g., a flexible material) windingly attached to the roller tube 112. The roller tube is not shown in FIGS. 3 and 4 since the roller tube is located behind the fascia 250 and hidden from view. For example, the covering material 220 may be any suitable material, or form any combination of materials (e.g., as described above for the covering material 120). As shown in FIG. 3, the window treatment system 200 may be configured in, for example, the reverse roll configuration in which the covering material 220 may hang from the roller tube away from the window (e.g., the roller tube may be located between the window and the covering material 220 that is hanging from the roller tube).

The window treatment system 200 may include a window treatment assembly, which may be similar to the window treatment assembly 110 shown in FIGS. 1 and 2), the fascia 250, and one or more mounting brackets (e.g., such as mounting bracket 230 that is described in more detail below). The window treatment assembly may include the roller tube, the covering material 220, a motor drive unit (e.g., similar to the motor drive unit 140) (not shown) at one end of the window treatment assembly, and an idler (e.g., similar to the idler 145) at the other end of the window treatment assembly. The mounting brackets may be configured to be coupled to or otherwise mounted to (e.g., attached to) a structure (e.g., a window frame, a wall, or other structure), such that the window treatment system 200 is mounted proximate to an opening (e.g., over the opening or in the opening), such as a window for example. The mounting brackets may be configured to be mounted to a vertical structure and/or mounted to a horizontal structure (e.g., ceiling-mounted to a ceiling).

The roller tube of the window treatment assembly may operate as a rotational element of the window treatment system 200. The window treatment assembly may be rotatably mounted (e.g., rotatably supported) by the mounting brackets. The mounting brackets may extend from the structure to which the window treatment system 200 is mounted. The covering material 220 may be windingly attached to the roller tube, such that rotation of the roller tube causes the covering material 220 to wind around or unwind from the roller tube. For example, rotation of the roller tube may cause the covering material 220 to move between a raised position $P_{RAISED}$ (e.g., a fully-raised position and/or a fully-open position) and a lowered position $P_{LOWERED}$ (e.g., a fully-lowered position and/or a fully-closed position). The covering material 220 may include a first end (e.g., a top or upper end) that is coupled to the roller tube and a second end (e.g., a bottom or lower end) that is coupled to a bottom bar 225 (e.g., a hembar). The bottom bar 225 may be configured, for example weighted, to cause the covering material 220 to hang vertically. Rotation of the roller tube may cause the bottom bar 225 to move toward or away from the roller tube 212 between the raised position $P_{RAISED}$ and the lowered position $P_{LOWERED}$.

Figure 5:
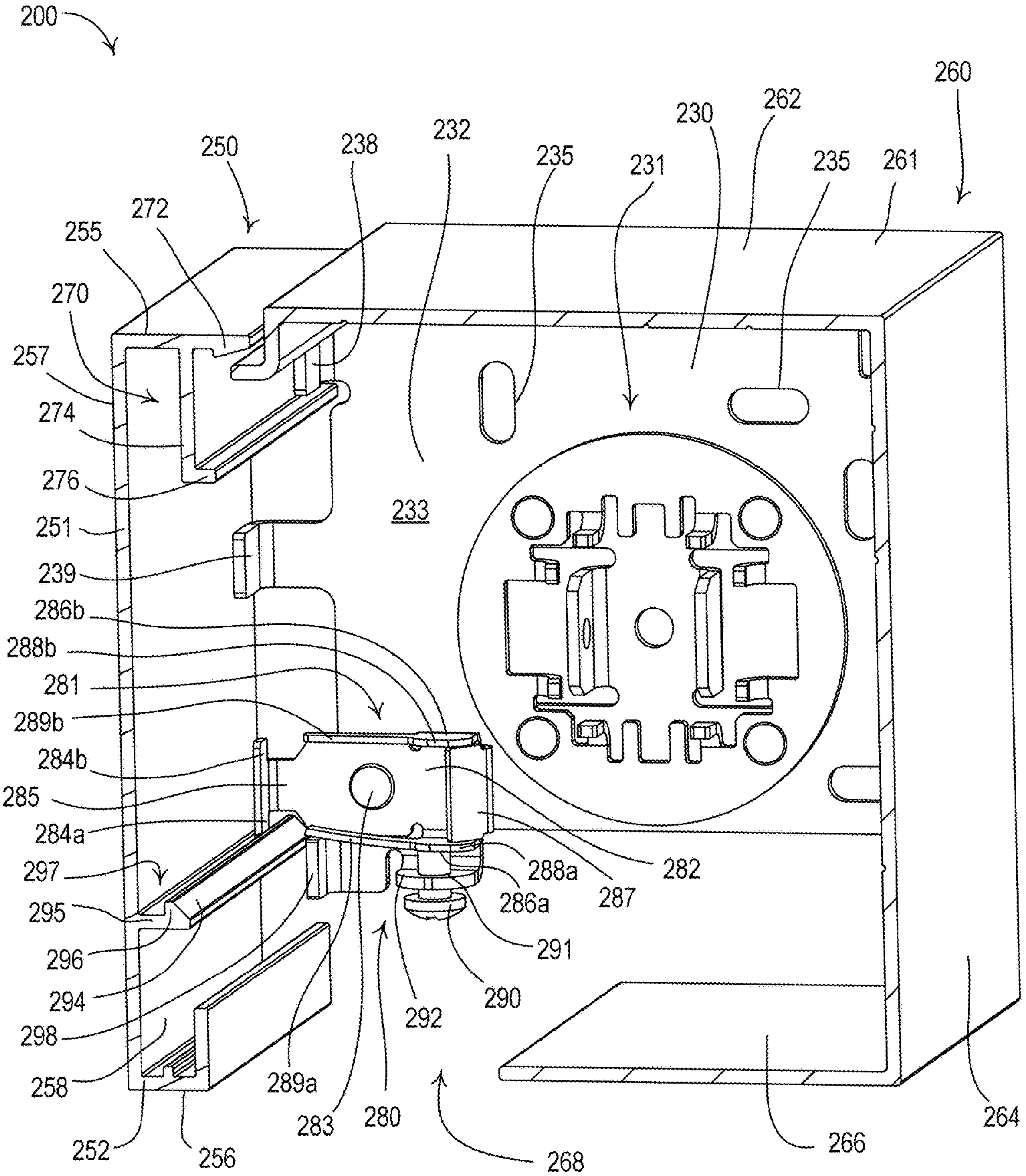
FIG. 5 is a perspective cross-section view of the window treatment system of FIG. 3 with a locking mechanism of the window treatment system in a locked position (e.g., taken through the line A-A shown in FIG. 4).
Figure 6:
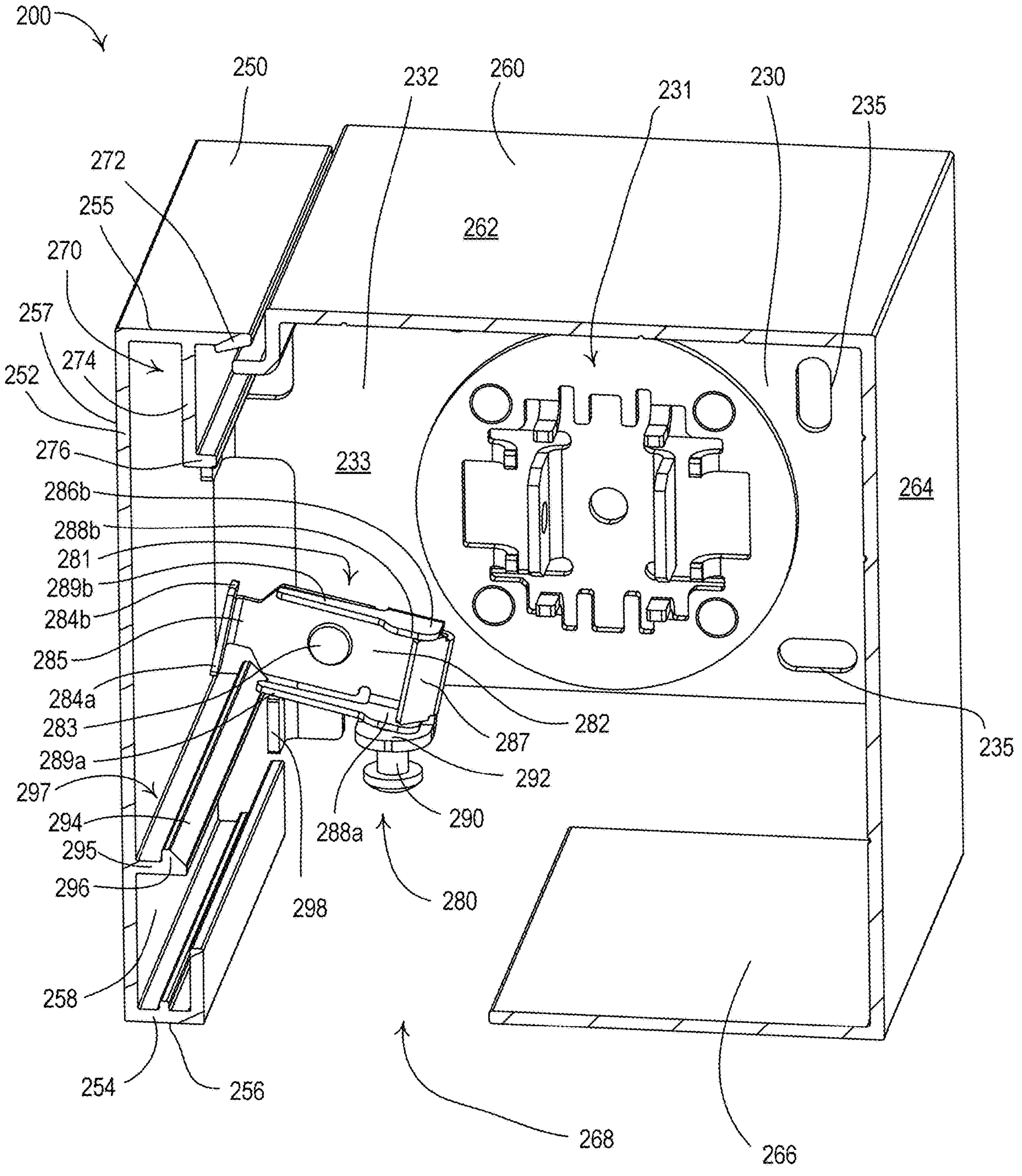
FIG. 6 is a side cross-section view of the window treatment system of FIG. 3 with the locking mechanism of the window treatment system in an unlocked position (e.g., taken through the line A-A shown in FIG. 4).
Figure 7:
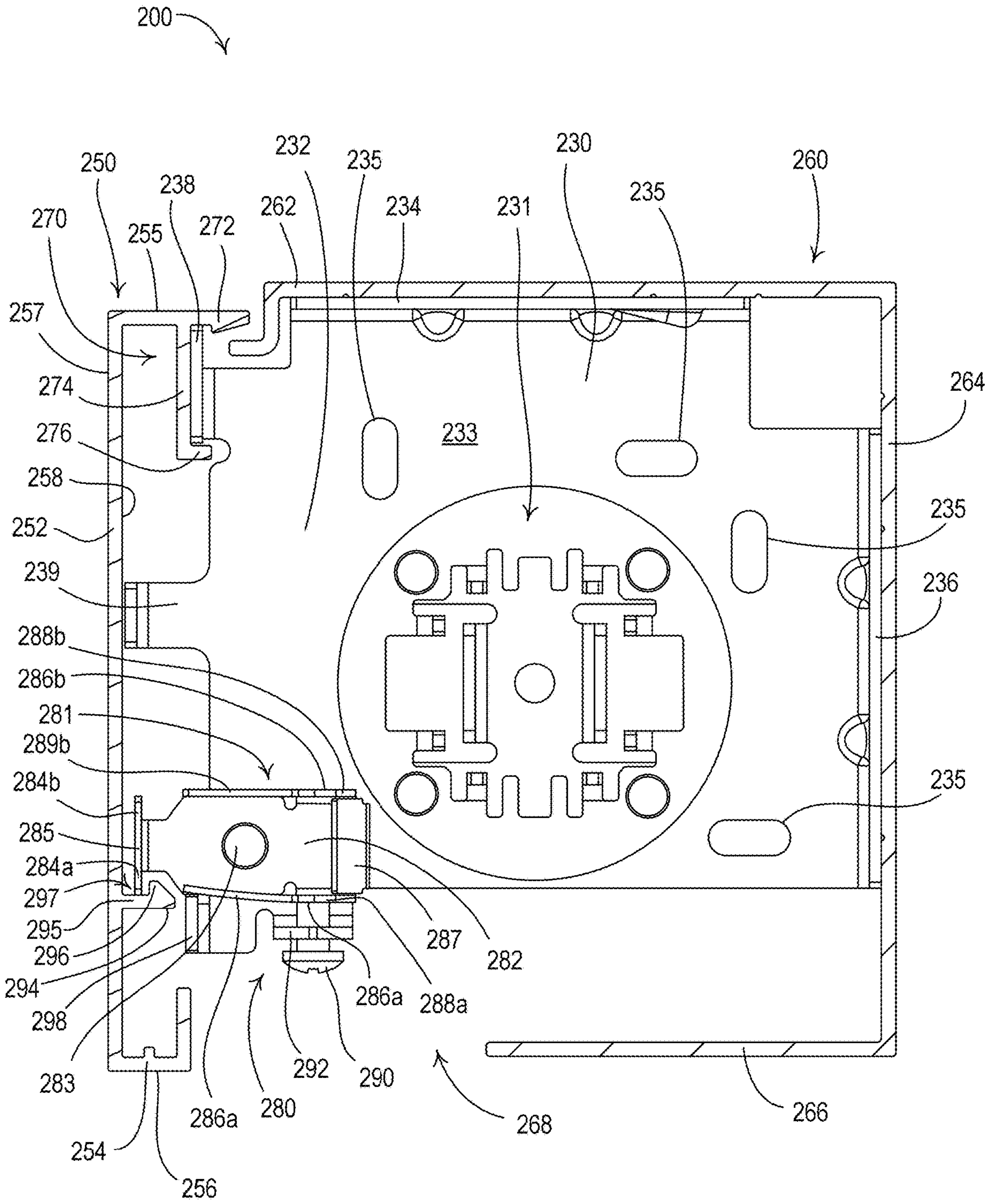
FIG. 7 is a side cross-section view of the window treatment system of FIG. 3 with the locking mechanism of the window treatment system in the locked position (e.g., taken through the line A-A shown in FIG. 4).
Figure 8:
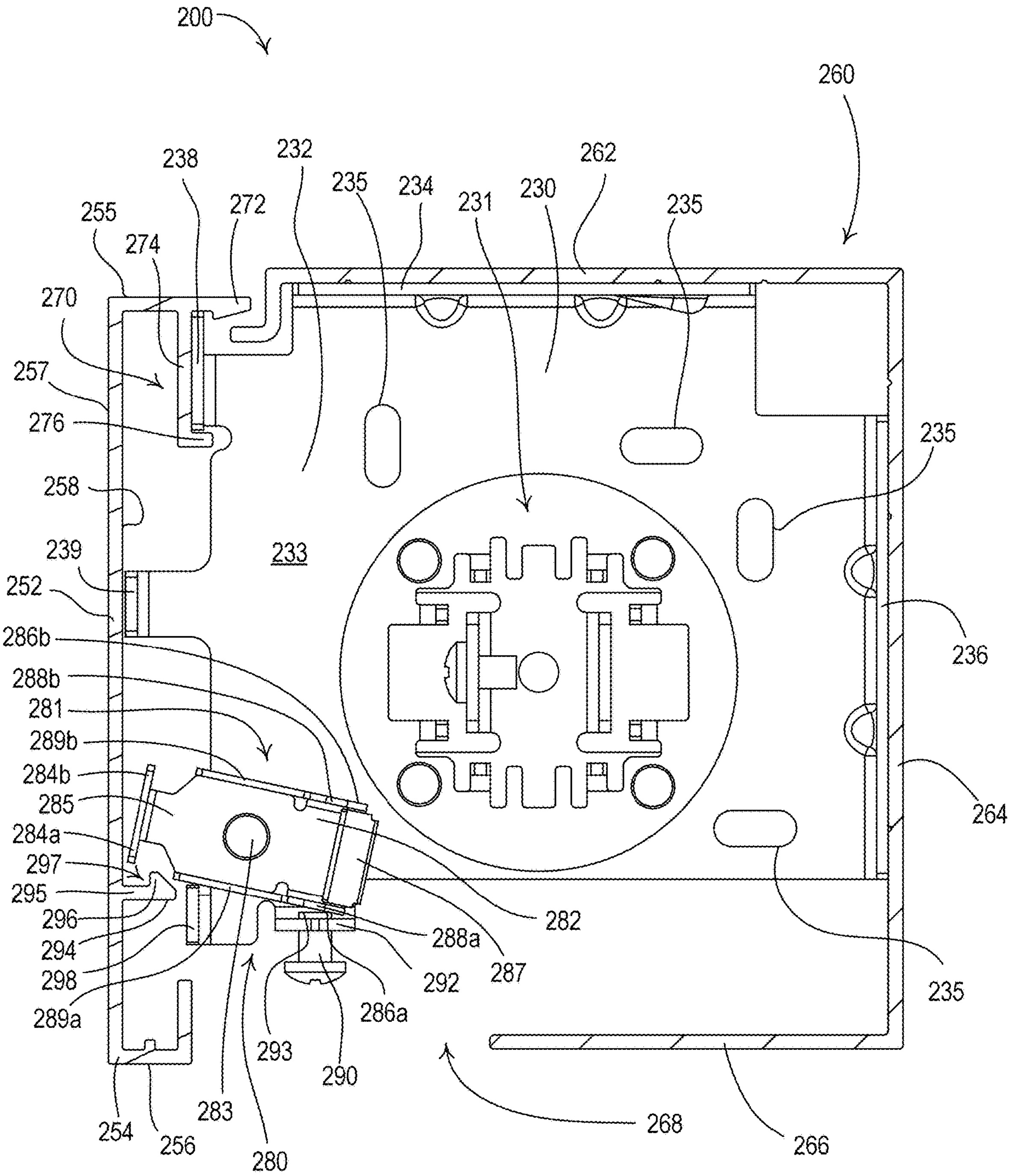
FIG. 8 is a perspective cross-section view of the window treatment system of FIG. 3 with the locking mechanism of the window treatment system in the unlocked position (e.g., taken through the line A-A shown in FIG. 4).

FIGS. 5 and 6 are perspective cross-section views and FIGS. 7 and 8 are side cross-section views of the window treatment system 200 with the window treatment assembly (e.g., the roller tube, the covering material 220, the motor drive unit, and the idler) not shown (e.g., taken through the line A-A shown in FIG. 4). The window treatment system 200 may also comprise a cover 260 (e.g., a top-back cover). The cover 260 may have a top wall 262 that extends over a top of the window treatment assembly (e.g., around the top and the rear of the roller tube) and a rear wall 264 that extends over a rear of the window treatment assembly. The fascia 250 and the cover 260 may form an enclosure (e.g., a headrail) for housing the roller tube of the window treatment assembly of the window treatment system 200. As shown in FIGS. 3 and 4, the fascia 250 may extend from a first end 251 to a second end 253 and the cover 260 may extend from a first end 261 to a second end 263. The window treatment system 200 may comprise a first mounting bracket 230 that may be located at the first end 251 of the fascia 250 and the first end 261 of the cover 260. FIGS. 5-8 show the first mounting bracket 230, the first end 251 of the fascia 250, and the first end 261 of the cover 260. The window treatment system 200 may also comprise a second mounting bracket (not shown) at the second end 253 of the fascia 250 and the second end 263 of the cover 260. For example, the second mounting bracket may be a mirror image of the first mounting bracket 230. One will recognize that window treatment system 200 does not require the cover 260.

As shown in FIG. 3, the fascia 250 may comprise a wall 252 (e.g., a front wall) that may extend from a top side 255 to a bottom side 256 to cover the roller tube. The wall 252 may have a front surface 257 that may provide an aesthetically pleasing appearance. In some examples, the front surface 257 of the wall 252 of the fascia 250 may be covered with a material that matches a material of the covering material 220. The fascia 250 may comprise a lip 254 at a bottom side 258 of the wall 252. In some examples, the window treatment system 200 may comprise one or more end caps 265 coupled to the first and second ends 261, 263 of the cover 260. The end caps 265 may cover an exterior surface of the first bracket 230 and the second bracket, and may be of a same material as the cover 260. The cover 260 may also comprise a bottom portion 266 that may extend perpendicular to the rear wall 264 (e.g., horizontally). The bottom portion 266 may extend partially across a bottom side of the enclosure formed by the fascia 250 and the cover 260 (e.g., across a bottom of the roller tube of the window treatment assembly of the window treatment system 200). Together, the fascia 250 and the cover 260 (e.g., and in some examples the end caps 265) may enclose (e.g., at least partially enclose) the roller tube, the first mounting bracket 230, and the second mounting bracket. The cover 260 (e.g., the bottom portion 266) and the fascia 250 (e.g., the lip 254) may be spaced apart by a gap 268 through which the covering material 220 may extend to cover the window.

The fascia 250 (e.g., the wall 252) may be configured to be connected to (e.g., and hang from) the first mounting bracket 230 and the second mounting bracket. As shown in FIGS. 5-8, the first mounting bracket 230 may comprise a mounting structure 231 to which the window treatment assembly (e.g., the motor drive unit) of the window treatment system 200 may be attached. The mounting structure 231 may extend from a side wall 232 of the first mounting bracket 230 (e.g., from an inner face 233 of the sidewall 232). The second mounting bracket may comprise a mounting structure (e.g., similar to the mounting structure 231) to which the idler of the window treatment assembly of the window treatment system 200 may be attached. The side wall 232 of the first mounting bracket 230 may have one or more openings 235 for mounting the first mounting bracket 230 to sides of a window frame (e.g., jamb-mounting the window treatment system 200). As shown in FIGS. 7 and 8, the first mounting bracket 230 may also comprise a top wall 234 and a rear wall 236 having respective openings (e.g., similar to the openings 235) for mounting the first mounting bracket 230 to a ceiling of a building or a wall of a building, respectively. In addition, the second mounting bracket may have openings (e.g., similar to the openings 235) on a sidewall, a top wall, and a rear wall for mounting the second mounting bracket to sides of a window frame, a ceiling, or a wall of a building, respectively.

The fascia 250 may comprise an attachment structure 270 extending from a rear surface 258 of the fascia 250 (e.g., opposite the front surface 257) at the top side 255 of the wall 252 (e.g., opposite the bottom side 256). The attachment structure 270 may be configured to be attached to an attachment tab 238 of the first mounting bracket 230. The attachment structure 270 may comprise an upper support 272 (e.g., a hook), a body 274, and a lower support 276 (e.g., a flange). The body 274 may extend between the upper support 272 and the lower support 276, such that the upper support 272 and the lower support 276 are at opposite ends of the body 274. The upper support 272 may be configured to sit on the attachment tab 238 (e.g., on a top side of the attachment tab) of the first mounting bracket 230. The lower support 276 may be configured to be positioned underneath the attachment tab 238 of the first mounting bracket 230 (e.g., underneath a bottom side of the attachment tab 238), such that the upper support 272 and the lower support 276 may cradle (e.g., hold) the attachment structure 270 against the attachment tab 238 (e.g., via friction hold). In some examples, the attachment structure 270 may not comprise the lower support 276. For example, the attachment structure 270 may extend the full length of the fascia 250. In some examples, the attachment structure 270 may only extend for a portion of the fascia 250 near the first mounting bracket 230 (e.g., at the first end 251 of the fascia 250), and the fascia 250 may comprise a second attachment structure (e.g., similar to the attachment structure 270) that extends for a portion of the fascia 250 near the second mounting bracket (e.g., at the second end 253 of the fascia 250).

The first mounting bracket 230 may also comprise an arm 239 positioned laterally below the attachment structure 270 and having a surface configured to abut against the rear surface 259 of the wall 252 of the fascia 250 when the attachment structure 270 is attached to the attachment tab 238. The arm 239 may assist in keeping the wall 252 of the fascia 250 vertically aligned (e.g., vertically straight).

The first mounting bracket 230 may further comprise a locking mechanism 280 configured to lock (e.g., detachably lock) the fascia 250 to the first mounting bracket 230 at a lower side of the first mounting bracket 230 (e.g., opposite the attachment tab 238) once the fascia 250 is attached to the attachment structure 255, for example. The locking mechanism 280 may be located at a lower front corner of the side wall 232 of the first mounting bracket 230. The locking mechanism may be positioned on the inner face 233 of the first mounting bracket 230.

The locking mechanism 280 may comprise a lever 281 having a body 282 configured to pivot about a pivot member 283. The lever 281 may be supported by the first mounting bracket 230 (e.g., via the pivot member 283, which may be attached to the first mounting bracket 230) and may be configured to pivot about the pivot member 283 with respect to the first mounting bracket 230. For example, the pivot member 283 may comprise a cylindrical body (e.g., a rivet) that extends from the side wall 232 of the first mounting bracket 230 (e.g., through an opening in the side wall 232) and an opening in the body 282 of the lever 281 to hold the body 282 adjacent to and possibly against the inner face 233 of the side wall 232 of the first mounting bracket 230. For example, the pivot member 283 may be integral with the first mounting bracket 230 or a separate part from the first mounting bracket 230. The lever 281 may comprise a locking tab **284*a* at a first end 285 of the body 282 and a contact surface 286*a* at a second end 287 of the body 282 (e.g., opposite the first end 285 of the body 282). The contact surface 286*a* may be on a wall 288*a* of the lever 281. For example, the wall 288*a* may extend approximately perpendicular to the body 282. For example, the body 282 may be oriented vertically and the wall 288*a* oriented horizontally (e.g., perpendicular to the body 282). The opening through which the pivot member 283 is received may be located on the body 282 between the first end 285 and the second end 287 (e.g., a fulcrum of the lever 281 may be located between the first end 285 and the second end 287, such that the lever 281 forms a first-class lever). The wall 288*a* may be, a horizontally-oriented surface that faces downward towards the gap 268 between the fascia 250 and the cover 260**.

The locking mechanism 280 may further comprise an actuation member, such as a screw 290, which may extend through an opening 291 in an extension 292 of the first mounting bracket 230. For example, the screw 290 may be threaded. The extension 292 may extend from the side wall 232 of the first mounting bracket 230 at an angle (e.g., approximately) 90° with respect to the side wall 232, such that the screw 290 may be configured to move in an upward direction as the screw 290 is turned in a first rotational direction (e.g., as the screw 290 is tightened) and in a downward direction as the screw 290 is turned in a second rotational direction that is opposite the first rotational direction (e.g., as the screw 290 is loosened). For example, the opening 291 (FIG. 5) may be threaded to accommodate the upward movement of the screw 290 when the screw 290 is turned in the first rotational direction and the downward movement of the screw 290 when the screw 290 is turned in the second rotational direction. As the screw 290 is turned in the first rotational direction, an end 293 (FIG. 8) of the screw 290 may contact the contact surface 286*a* of the lever 281 to cause the body 282 to pivot about the pivot member 283. When the screw 290 moves in the upward direction, the second end 285 of the body 282 may move in the upward direction (e.g., an upward rotational direction) and the first end 285 of the body 282 to move in a downward direction (e.g., a downward rotational direction). The screw 290 may be located such that a tool (e.g., a screwdriver) maybe received through the gap 268 between the fascia 250 and the cover 260. The locking mechanism 280 may be hidden from view of a typical user of the motorized window treatment system 200 by the lip 254 of the fascia 250.

The fascia 250 may comprise a locking member 294 configured to engage with the locking tab 284*a* of the lever 281 of the locking mechanism 280. The locking member 294 may comprise an arm 295 that extends from the rear surface 258 of the wall 252 of the fascia 250 (e.g., away from the rear surface 258 of the wall 252 of the fascia 250). The locking member 294 may comprise a flange 296 that extends from the arm 295, such that the arm 295, the flange 296, and the rear surface 258 of the wall 252 of the fascia 250 form a recess 297. The flange 296 may extend upward and may be perpendicular to the arm 295.

The locking mechanism 280 may be operable between a locked position (e.g., as shown in FIGS. 5 and 7) and an unlocked position (e.g., as shown in FIGS. 6 and 8). When the locking mechanism 280 is in the locked position, the body 282 of the lever 281 may be horizontal (e.g., the first end 285 and the second end 287 may be untilted with respect to each other). In the locked position, the body 282 of the lever 281 (e.g., a bottom surface of the body 282 of the lever 281) may contact an abutment tab 298 on the first mounting bracket 230 and the locking tab 284*a* of the lever 281 may be received in the recess 297 of the locking member 294. For example, the abutment tab 298 may be located on a front side of the first mounting bracket 230 near the fascia 250 (e.g., adjacent to the locking member 294 extending from the rear surface 298) and below the lever 281, and may be configured to prevent the screw 290 from being over-tightened. When the locking tab 284*a* of the lever 281 is received in the recess 297 of the locking member 294, engagement of the locking tab 284*a* with the flange 296 of the locking member 294 may prevent the fascia 250 from being decoupled from the first mounting bracket 230. For example, when the fascia 250 is connected to the first mounting bracket 230 and the locking mechanism 280 is locked, the attachment structure 270 may prevent vertical movement of the fascia 250 and the locking tab 284*a* may prevent horizontal and/or rotational movement of the fascia 250.

When the locking mechanism 280 is in the unlocked position, the body 282 of the lever 281 may be tilted (e.g., with the first end 285 up and the second end 287 down), such that the locking tab 284*a* of the lever 281 is not received in the recess 297 of the locking member 294. When the locking tab 284*a* is not located in the recess 297 of the locking member 294, the fascia 250 may be decoupled (e.g., removed) from the first mounting bracket 230. The locking mechanism 280 may be adjusted from the unlocked position to the locking position by turning the screw 290 in the first rotational direction to cause the locking tab 284*a* to be received in the recess 297 of the locking member 294. The locking mechanism 280 may be adjusted from the locking position to the unlocked position by turning the screw 290 in the second rotational direction to cause the locking tab 284*a* to be removed from the recess 297 of the locking member 294.

The locking mechanism 280 may further comprise a spring member, such as a spring arm 289*a* of the lever 281, which may be configured to operate (e.g., automatically operate) the locking mechanism 280 into the unlocked position when the screw 290 is loosened, such that the fascia 250 may be decoupled from the first mounting bracket 230. The spring arm 289*a* may extend from the wall 288*a* of the lever 281 and may contact the abutment tab 298 of the first mounting bracket 230 to bias (e.g., automatically bias) the locking mechanism 280 (e.g., the lever 281 of the locking mechanism 280) into the unlocked position (e.g., to tilt the lever 281) when the screw 290 is loosened (e.g., as shown in FIGS. 6 and 8). When the screw 290 is tightened, the spring arm 289*a* may be configured to flex and allow the locking mechanism 280 to be operated into the locked position (e.g., as shown in FIGS. 5 and 7). Additionally and/or alternatively, the spring member of the locking mechanism 280 may comprise a coil spring located at the first end 285 of the body 282 of the lever 281 to bias the first end 285 upward and thus operate the locking mechanism 280 (e.g., the lever 281 of the locking mechanism 280) into the unlocked position when the screw 290 is loosened. In some examples, the lever 281 of the locking mechanism 280 may not comprise the spring arm 289*a*, and the locking mechanism 280 may be operated into the unlocked position in response to a user's finger tilting the body 282 of the lever 281.

As previously mentioned, the second mounting bracket may be a mirror image of the first mounting bracket 230. The second mounting bracket may comprise a locking mechanism that may be similar to and a mirror image of the locking mechanism 280 of the first mounting bracket 230. The lever 281 may be designed such that the lever 281 may be used on the first mounting bracket 230 at the first end 251 of the fascia 250 and on the second mounting bracket at the second end 253 of the fascia 250. For example, the lever 281 may comprise a second locking tab 284*b* at the first end 285 of the body 282, a second contact surface 286*b* defined by a second wall 288*b* at the second end 287 of the body 282, and a second spring arm 289*b*. For example, the locking member 294 on the rear surface 258 of the fascia 250 may extend the full length of the fascia 250, such that the locking mechanism on the second mounting bracket (e.g., at the second end 253 of the fascia) may be configured to engage with the locking member 294. In some examples, the locking member 294 may only extend for a portion of the fascia 250 near the first mounting bracket 230 (e.g., at the first end 251 of the fascia 250), and the fascia 250 may comprise a second locking member (e.g., similar to the locking member 294) that extends for a portion of the fascia 250 near the second mounting bracket (e.g., at the second end 253 of the fascia 250).

Although features and elements may be described herein in particular combinations, each feature or element may be used alone or in any combination with the other features and elements. While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A window treatment system comprising:

a window treatment assembly having a covering material that is operable between a raised position and a lowered position;

first and second mounting brackets configured to support the window treatment assembly;

a fascia having an attachment structure for coupling the fascia to the first mounting bracket, the attachment structure extending from a rear surface of the fascia, the fascia further comprising a locking member extending from the rear surface of the fascia; and a locking mechanism comprising a lever supported by the first mounting bracket and configured to pivot with respect to the first mounting bracket, the lever comprising a first end having a locking tab and a second end having a contact surface, the locking mechanism further comprising an actuation member configured to contact the contact surface at the second end of the lever, the actuation member configured to be driven in a first direction to cause the second end of the lever to move in the first direction and the first end of the lever to move in a second direction opposite the first direction to operate the locking mechanism into a locked position in which the locking tab is received in a recess of the locking member of the fascia;

wherein the actuation member is further configured to move in the second direction to operate the locking mechanism into an unlocked position in which the locking tab is not received in the recess of the locking member of the fascia.

2. The window treatment system of claim 1, wherein the first direction is an upward direction and the second direction is a downward direction.

3. The window treatment system of claim 2, wherein the actuation member comprises a screw configured to extend through an opening in an extension of the first mounting bracket, the screw comprising an end configured to contact the contact surface at the second end of the lever.

4. The window treatment system of claim 3, wherein the screw is configured to move in the upward direction when the screw is tightened to operate the locking mechanism into the locked position.

5. The window treatment system of claim 4, wherein the screw is configured to move in the downward direction when the screw is loosened to allow the locking mechanism to be operated into the unlocked position.

6. The window treatment system of claim 5, wherein the lever comprises a body extending between the first end and the second end, and a wall that is located at the second end of the lever and defines the contact surface at the second end of the lever.

7. The window treatment system of claim 6, wherein the lever comprises a spring arm extending from the wall towards the first end of the lever, the spring arm configured to contact an abutment tab of the first mounting bracket to operate the locking mechanism into the unlocked position when the screw is loosened.

8. The window treatment system of claim 3, wherein the screw and the opening of the extension of the first mounting bracket are threaded.

9. The window treatment system of claim 1, wherein the first mounting bracket comprises an abutment tab, and the lever is configured to contact the abutment tab when the locking mechanism is in the locked position.

10. The window treatment system of claim 9, wherein the lever comprises a spring arm configured to contact the abutment tab to operate the locking mechanism into the unlocked position.

11. The window treatment system of claim 10, wherein the spring arm is configured to flex when the locking mechanism is in the locked position.

12. The window treatment system of claim 1, wherein the lever is configured to pivot about a pivot member that is located between the first end and the second end of the lever.

13. The window treatment system of claim 12, wherein the pivot member is cylindrical and extends through a circular opening of a body of the lever.

14. The window treatment system of claim 13, wherein the pivot member comprises a rivet configured to couple the lever to the first mounting bracket.

15. The window treatment system of claim 13, wherein the pivot member is integral with the first mounting bracket.

16. The window treatment system of claim 13, wherein the pivot member is a separate part from the first mounting bracket.

17. The window treatment system of claim 1, wherein the lever comprises a spring arm configured to operate the locking mechanism into the unlocked position.

18. The window treatment system of claim 1, wherein the first mounting bracket comprises an attachment tab configured to engage the attachment structure of the fascia to couple the fascia to the first mounting bracket.

19. The window treatment system of claim 1, wherein the fascia may be decoupled from the first mounting bracket when the locking mechanism is in the unlocked position.

20. The window treatment system of claim 1, wherein the locking mechanism comprises a first locking mechanism, and the window treatment system further comprises:

a second locking mechanism comprising a lever supported by the second mounting bracket and configured to pivot with respect to the second mounting bracket, the lever of the second locking mechanism comprising a first end having a locking tab and a second end having a contact surface, the second locking mechanism further comprising an actuation member configured to contact the contact surface at the second end of the lever, the actuation member of the second locking mechanism configured to be driven in a first direction to cause the second end of the lever to move in the first direction and the first end of the lever to move in a second direction opposite the first direction to operate the second locking mechanism into a locked position in which the locking tab is received in the recess of the locking member of the fascia;

wherein the actuation member of the second locking mechanism is further configured to move in the second direction to operate the second locking mechanism into an unlocked position in which the locking tab is not received in the recess of the locking member of the fascia.

* * * * *